United States Patent
Jennes et al.

[15] 3,692,875
[45] Sept. 19, 1972

[54] ELASTOMERIC MIXTURE OF A BENZENE-SOLUBLE POLYCHLOROPRENE AND A CROSSLINKED CHLOROPRENE POLYMER

[72] Inventors: Gert Jennes, Cologne-Flittard; Edmund Huther, Opladen; Willi Wolff, Schildgen, all of Germany

[73] Assignee: Farbenfabriken Bayer Aktiengesellschaft, Leverkusen, Germany

[22] Filed: May 10, 1968

[21] Appl. No.: 728,350

[30] Foreign Application Priority Data

June 6, 1967 Germany..................F 52 611

[52] U.S. Cl..............260/890, 260/29.7 R, 260/83.5
[51] Int. Cl................................................C08f 29/22
[58] Field of Search....................260/890, 83.5, 86.3

[56] References Cited

UNITED STATES PATENTS

| | | | |
|---|---|---|---|
| 3,261,888 | 7/1966 | Cornell et al. | 260/877 |
| 3,042,652 | 7/1962 | Pariser et al. | 260/890 |
| 3,147,317 | 9/1964 | Jungk et al. | 260/890 |

FOREIGN PATENTS OR APPLICATIONS

| | | | |
|---|---|---|---|
| 799,043 | 7/1958 | Great Britain | 260/4 |
| 851,491 | 10/1960 | Great Britain | 260/876 |

*Primary Examiner*—Samuel H. Blech
*Attorney*—Connolly and Hutz

[57] ABSTRACT

A composition comprising a) a crosslinked copolymer of chloroprene and a diester of an unsaturated carboxylic acid and b) a benzene-solution chloroprene and a process for producing this composition.

5 Claims, No Drawings

ELASTOMERIC MIXTURE OF A BENZENE-SOLUBLE POLYCHLOROPRENE AND A CROSSLINKED CHLOROPRENE POLYMER

Benzene-soluble chloroprene polymers and crosslinked chloroprene polymers are known. For example, a benzene-soluble polymer can be obtained by polymerizing chloroprene (2-chloro-1,3-butadiene) in emulsion in the presence of regulators, emulsifiers and activators at temperatures of around 40° C and with a monomer conversion of less than 70 percent. The production of such polymers is described in detail, for example, in U.S. Pat. specifications, Nos. 1,950,436; 2,227,517; 2,321,693; 2,371,719; 2,463,225; 2,481,044; 2,494,087; 2,567,117; 2,576,009; 2,831,842; 2,914,497; 2,467,769 and 3,147,318. If polymerization is continued to monomer conversion rates of more than 90 percent, or is carried out in the absence of regulators, crosslinked polymers, insoluble in benzene, are obtained (U.S. Pat. No. 3,147,317).

Crosslinked polymers are obtained at polymerization temperatures above 75° C, even with fairly low monomer conversions (cF. British Pat. specification, No. 1,052,581).

These crosslinked chloroprene polymers are usually employed in admixture with benzene-soluble chloroprene polymers (cf. U.S. Pat. No. 3,147,318).

It has now been found that a readily processed polychloroprene mixture can be obtained by mixing
a. a crosslinked chloroprene polymer obtained by copolymerizing chloroprene and at most 20 percent by weight, based on chloroprene, of a diester of a dihydric alcohol containing from two to 10 carbon atoms and an acrylic acid in aqueous emulsion to form a copolymer latex,
b. a latex of a benzene-soluble polychloroprene in a ratio by weight of from 1 : 4 to 4 : 1, based on solids in the latex, and
c. coagulating the resulting mixture in a manner known per se.

The crosslinked chloroprene polymers a) are prepared by copolymerizing chloroprene and at least 2 and at most 20 percent by weight of a diester of a dihydric alcohol and an acrylic acid in aqueous emulsion. Compounds corresponding to the general formula.

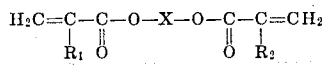

in which $R_1$ and $R_2$ each represents a hydrogen or chlorine atom or an alkyl radical with from one to 4 carbon atoms, and X represents a bivalent aliphatic radical (e.g., bivalent alkyl) with from two to 10 carbon atoms, are particularly suitable for use as the diester of a dihydric alcohol with an acrylic acid. In other words, it is essential that the two ethylenically unsaturated double bonds in this compound should be separated from one another by at least six atoms. Examples of suitable diesters corresponding to this formula include ethylene dimethacrylate, propylene dimethacrylate, butylene dimethacrylate, isobutylene dimethacrylate, ethylene diacrylate, propylene diacrylate, butylene diacrylate and isobutylene diacrylate.

The polymerization process is carried out in a manner known per se. Any of the conventional emulsifiers may be used, including, for example, water-soluble salts, in particular alkali metal or ammonium salts of long-chain fatty acids, resin acids, disproportionated abietic acid, aryl sulphonic acids and their formaldehyde condensation products, alkyl and aralkyl sulphonates or sulphates, oxethylated alcohols or phenols.

Polymerization is carried out in the presence of conventional catalysts that form free radicals, for example, hydrogen peroxide, cumene hydroperoxide, water-soluble salts of peroxy disulphuric acid or 2,2'-azo-bis-2-methyl proprionitrile. As a rule, the aqueous solution of the catalyst is introduced into an aqueous emulsion containing the monomers and the emulsifier. In general, polymerization is carried out at a pH-value of from 7 to 13 and at a temperature of from 0° to 60° C, the emulsion being adjusted in such a way that its total monomer content makes up between 40 and 55 percent of the total weight of the emulsion.

Polymerization may be terminated by the usual polymerization terminators, and any excess monomer may be removed by steam distillation. Details on the procedure, catalysts, terminators may be seen from the patents referred to above.

The latices of the benzene-soluble chloroprenes and their preparation are known from the patents mentioned earlier on, which are incorporated herein by reference.

After the two polymer latices have been mixed together, they are coagulated preferably by low-temperature coagulation, and the resulting coagulate is dried.

The polymers obtained by admixture of crosslinked and benzene-soluble polychloroprenes showed better processing properties than the benzene-soluble polymers. Thus, mixtures prepared from them show a greatly reduced tendency to swell on injection, greater dimensional stability and higher stability under load than corresponding mixtures obtained from the benzene-soluble polymers alone.

EXAMPLE 1

A crosslinked polychloroprene is prepared as follows: The following components are introduced into a 40 liter capacity autoclave which is equipped with stirring mechanism, thermometer and inlets and which is connected to a cooling system.

14.4 liters of desalted water, 815 g of the sodium salt of a disproportionated abietic acid mixture, 72 g of a condensation product of alkyl napthalene sulphonic acid and formaldehyde, 36 g of sodium hydroxide, 60 g of tetra sodium pyrophosphate.

A solution containing the following constituents is then run in:

10,620 g of chloroprene, 1,380 g of butylene dimethacrylate, 34 g of n-dodecyl mercaptan. The contents of the polymerization vessel are then flushed with nitrogen and heated to 42° C. Polymerization is initiated by an activator solution containing the following constituents:

Five g of formamidine sulphuric acid in solution in 150 g of desalted water. Activation is repeated every 30 minutes. When the latex has a polymer content of 35 g, equivalent to a monomer conversion of around 77 percent, polymerization is stopped by the addition of a stabilizer solution containing the following constituents:

Five g of phenothiazine, 5 g of p-tert.-butyl pryocatechol, and 500 g of benzene. Any unreacted monomers are then removed from the latex. 26.3 kg of an approximately 38 percent by weight latex are obtained. Polymerization may also be carried out continuously, in which case the aqueous phase, the monomer phase and the catalyst solution are pumped separately into the polymerization vessel.

The latex obtained in accordance with Example 1 is mixed with a polychloroprene latex which may be obtained in the usual way from chloroprene by emulsion polymerization, and which contains a benzene-soluble polychloroprene (Example 4). The latex mixture may be worked up in the usual way by low-temperature coagulation and drying.

EXAMPLE 2

1,380 g of ethylene dimethacrylate are used in place of the butylene dimethacrylate of Example 1. 26 kg of an approximately 38 percent by weight latex are obtained, which is mixed and worked up as described in Example 1.

EXAMPLE 3

1,380 g of diisopropenyl benzene are used instead of the butylene dimethacrylate of Example 1. Around 26 kg of an approximately 38 percent by weight latex are obtained which is mixed and worked up as described in Example 1.

EXAMPLE 4

Benzene-soluble polychloroprene is prepared by known methods in the presence of regulators, stopping polymerization at a monomer conversion of less than 70 percent and working up the resulting product as described in Example 1.

The mixtures obtained in accordance with Examples 1, 2, 3 and 4 are then blended in the usual way on mixing rolls with the following components: 100 parts by weight of polychloroprene, 29 parts by weight of semi-active furnace soot, 0.5 parts by weight of stearic acid, 2 parts by weight of phenyl-β-naphthylamine, 4 parts by weight of magnesium oxide, 5 parts by weight of zinc oxide, and 0.5 parts by weight of ethylene thiourea.

Vulcanization is carried out for 30 minutes at 151° C. The vulcanizates obtained in this way, and the mixtures, show the following properties when tested:

TABLE I

Mixture of a soluble polychloroprene with insoluble polychloroprene in a ratio by weight of 55:45 after testing

| | Example | | | Soluble polychloroprene [4] |
|---|---|---|---|---|
| | 3 | 2 | 1 | |
| Tensile strength (kg./cm.²) | 132 | 128 | 133 | 220 |
| Breaking elongation (percent) | 500 | 435 | 435 | 500 |
| Modulus 300% elongation (kg./cm.²) | 48 | 50 | 50 | 135 |
| Surface shrinkage of the mixture (percent) | 60 | 50 | 50 | 80 |
| Processing of the polymers on mixing rolls | Poor | (*) | (*) | Good |

*Very good.

We claim:
1. A process for the production of a readily processed polychloroprene mixture which comprises
   a. preparing a crosslinked chloroprene polymer by copolymerizing chloroprene and at most 20 percent by weight, based on chloroprene, of a diester of a dihydric alcohol and an acrylic acid in aqueous emulsion to form a copolymer latex,
   b. mixing the resulting latex with a latex of a benzene-soluble polychloroprene in a ratio by weight of from 1:4 to 4:1, based on solids in the latex, and
   c. coagulating the resulting mixture.

2. The process of claim 1 wherein the diester of a dihydric alcohol with an acrylic acid is a compound of the formula

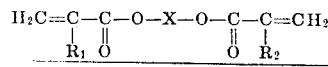

wherein $R_1$ and $R_2$ are hydrogen, chlorine or alkyl containing from one to four carbon atoms and X is a divalent aliphatic radical containing two to 10 carbon atoms and wherein the two ethylenically unsaturated double bonds of said formula are separated from one another by at least six atoms.

3. A composition of matter comprising a mixture of (a) a crosslinked copolymer of chloroprene and 2–20 percent by weight of an ester of the formula

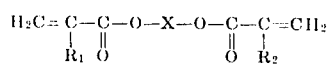

wherein $R_1$ and $R_2$ are hydrogen, chlorine or alkyl containing from one to four carbon atoms and X is a divalent aliphatic radical containing two to 10 carbon atoms and wherein the two ethylenically unsaturated double bonds of said formula are separated from one another by at least six atoms and (b) a benzene-soluble polychloroprene, the weight ratio of (a) to (b) being from 1:4 to 4:1.

4. The composition of matter of claim 3 wherein said ester of said formula is selected from the group consisting of ethylene dimethacrylate, propylene dimethacrylate, butylene dimethacrylate, isobutylene dimethacrylate, ethylene diacrylate, propylene diacrylate, butylene diacrylate and isobutylene diacrylate.

5. The composition of matter of claim 3 wherein said ester of said formula is butylene dimethacrylate.

* * * * *